W. P. McCORKINDALE.
VEHICLE TOP.
APPLICATION FILED JAN. 21, 1920.
1,395,129.
Patented Oct. 25, 1921.
Fig. 1
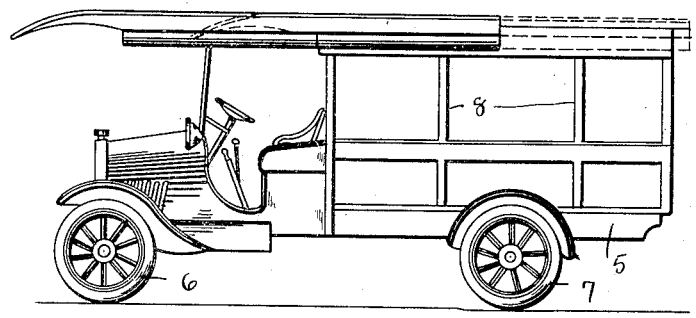
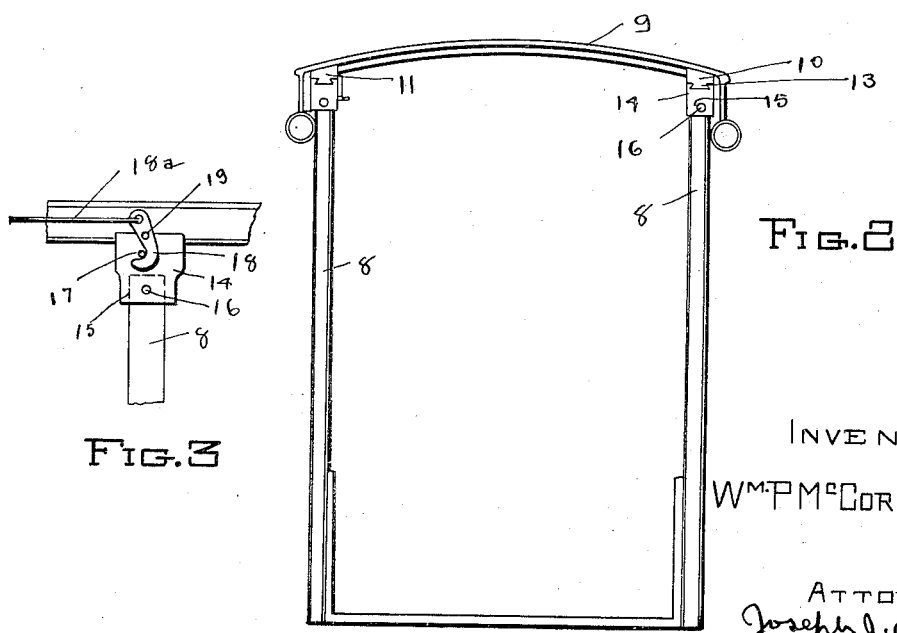
Fig. 2
Fig. 3
INVENTOR
Wᵐ P McCORKINDALE
ATTORNEY
Joseph J. O'Brien

UNITED STATES PATENT OFFICE.

WILLIAM P. McCORKINDALE, OF HOLYOKE, MASSACHUSETTS, ASSIGNOR OF ONE-HALF TO CHARLES A. LAWRENCE, OF HOLYOKE, MASSACHUSETTS.

VEHICLE-TOP.

1,395,129.     Specification of Letters Patent.     Patented Oct. 25, 1921.

Application filed January 21, 1920. Serial No. 353,129.

*To all whom it may concern:*

Be it known that I, WILLIAM P. McCORKINDALE, a citizen of the United States of America, residing at Holyoke, in the county of Hampden and State of Massachusetts, have invented certain new and useful Improvements in Vehicle-Tops, of which the following is a specification.

This invention relates to improvements in tops or roofs and supports thereof for motor driven trucks and other vehicles and its leading object is to provide a one piece or rigid non-jointed top or roof construction mounted to slide horizontally upon uprights or standards so that the truck or vehicle can be loaded from a chute or by block and tackle or the like by shifting the roof or top horizontally on the truck or vehicle and the invention is embodied in a construction which is adapted to prevent displacement of the top or roof on the guides or supports regardless of the position of the top or roof.

With the above and other objects in view this invention relates to certain new and useful constructions, combinations and arrangements of parts, clearly described in the following specification and fully illustrated in the accompanying drawings, in which:

Figure 1 is a side elevation showing the top or roof shifted forwardly of its normal position, and showing the top or roof in its normal position in dotted lines.

Fig. 2 is a rear end elevation of the vehicle body showing the construction of the sliding connections between the top and roof and the uprights.

Fig. 3 is a detail side elevation showing one of the gravity stops for holding the top or roof against sliding.

Referring to the accompanying drawings 5 designates the body of a truck or vehicle of the motor driven type having front wheels 6 and rear wheels 7 and uprights 8 mounted against the sides of the body and extending a considerable distance thereabove to support the roof. In the ordinary covered truck or vehicle it is difficult to load the vehicle with heavy boxes or barrels or the like from the rear end and the requirements of general trucking compel operators to give preference to covered trucks or vehicles. My invention provides a roof or top 9 of rigid construction to the undersides of which longitudinal members or runners 10 and 11 are fixed. The members 10 and 11 are shown to be provided with dove tailed ribs 12 which are designed to engage corresponding grooves 13 formed in the upper ends of the uprights 8 or in a member 14 detachably mounted upon the upper end of each of the uprights or standards 8 by means of a socketed lower end 15 and a securing bolt 16.

The members 14 of the uprights 8 are provided with pins 17 which are engaged by gravity hooks or dogs 18 pivoted at 19 to the sides of the runners 10 and 11.

When it is desired to shift the roof or top 9 longitudinally on the vehicle 5 so as to uncover the major portion or any part of the bed of the vehicle the dogs or retaining latches 18 are disengaged with the pin 17 and the entire roof is bodily shifted horizontally on the upper ends of the uprights 8 or the members 14 as the case may be. The sliding interlocking connection between the runners 10 and 11 and the supporting uprights 8 prevents vertical displacement of the roof or top from said members while the dogs 18 prevent horizontal displacement.

My improved vehicle top provides a rigid roof or covering for the body of a vehicle which can be easily shifted to uncover the body of the vehicle without much effort and as easily returned to its normal position. The construction is such as to not require any change in the design of the vehicle or the body thereof and requires only a slight modification of the upper ends of the supporting standards.

The usual side curtains can be supported on the under side of the slidable roof or top and shifted when the top or roof is bodily shifted. The top or roof can be shifted from the front end of the vehicle so that the operator is not required to climb over the load.

Having described my invention, I claim:

In combination, a vehicle having upright sides and a bed, guides mounted on said sides, a roof slidably interlocked with said guides to shift forwardly, a pin carried by one of said guides, a latch carried by said roof to engage said pin and a rod for releasing said latch for engagement with said pin, said roof being slidably forward to uncover the bed to permit of loading and discharging from above the vehicle.

Signed at 159 Essex St., Holyoke, Mass.

WILLIAM P. McCORKINDALE.